United States Patent
Bruce et al.

[15] 3,635,660
[45] Jan. 18, 1972

[54] PHOSPHATE AND PHOSPHORS PREPARED THEREFROM

[72] Inventors: Joseph A. G. Bruce; Henry M. Levy; Pyliss Oborn, all of London, England

[73] Assignee: Thorn Electrical Industries Limited, London, England

[22] Filed: Feb. 5, 1969

[21] Appl. No.: 796,813

[52] U.S. Cl. ............................ 23/108, 23/109, 252/301.4 P
[51] Int. Cl. ..................................... C01b 25/32, C09k 1/36
[58] Field of Search ....................... 23/108, 109; 252/301.4 P

[56] References Cited

UNITED STATES PATENTS

| | | | |
|---|---|---|---|
| 2,765,281 | 10/1956 | Chrien | 252/301.4 P |
| 3,505,012 | 4/1970 | Dale et al. | 23/109 |
| 2,876,168 | 3/1959 | Broge et al. | 23/108 X |
| 2,901,400 | 8/1959 | Thomas | 23/108 X |
| 3,012,852 | 12/1961 | Nelson | 23/109 |
| 3,095,269 | 6/1963 | Chiola et al. | 23/109 |

FOREIGN PATENTS OR APPLICATIONS

| | | | |
|---|---|---|---|
| 927,353 | 5/1963 | England | 252/301.4 P |

OTHER PUBLICATIONS

Rabatin et al., J of Physical Chemistry, pp. 491– 493, Vol. 64, Apr. 1960

Parodi et al., " Electronic Paramagnetic Resonance Study of the Thermal Decomposition of Dibasic Calcium Orthophosphate," 112 J. of the Electrochemical Society 688– 692 (No. 7, July 1965)

Primary Examiner—Oscar R. Vertiz
Assistant Examiner—Charles B. Rodman
Attorney—Owen J. Meegan

[57] ABSTRACT

A new form of $\gamma$—calcium pyrophosphate having a rhambohedral crystal shape and regular particle size, more especially in the range 8–8½ microns, is prepared by controlled heating of anhydrous calcium hydrogen phosphate having a similar crystal form and particle size. The latter phosphate is prepared by precipitation of brushite and dehydration in an aqueous medium such as aqueous phosphoric acid at an elevated temperature. When the new pyrophosphate is employed as a source of calcium and phosphate ions in the preparation of luminescent phosphors, the products have enhanced luminescent brightness as compared with those produced from conventional calcium hydrogen phosphate.

1 Claims, 4 Drawing Figures

PHOSPHATE AND PHOSPHORS PREPARED THEREFROM

This invention relates to the preparation of an improved form of gamma-calcium pyrophosphate, which can be used to advantage in the preparation of many well-known phosphors, such as pyro-, ortho- and halo-phosphate phosphors, which find application in fluorescent discharge tubes and cathode-ray tubes.

In the preparation of phosphors containing calcium and phosphate ions, the calcium and phosphate components are commonly supplied in the form of calcium hydrogen phosphate, which is prepared by conventional methods.

It has now been found that extremely pure crystalline γ-calcium pyrophosphate can be prepared having regular particle size and rhombohedral crystal form. When this material is used as a component of a firing mixture in the preparation of a phosphor, the resultant phosphor shows a higher lumen output than hitherto. For the brightest phosphors, it has been found that the γ-pyrophosphate in accordance with this invention preferably has a particle size predominantly in the range of 8–8½ microns.

In accordance with the invention, it has further been found that an improved γ-calcium pyrophosphate, having such advantages in phosphor preparation, can be prepared by controlled heating of a form of anhydrous calcium hydrogen phosphate of regular particle size and crystal form, which can itself be made by a recrystallization technique under carefully controlled and critical conditions and which, on conversion to the γ-pyrophosphate, retains its particular crystal shape and particle size distribution.

The preferred preparation of the γ-pyrophosphate in accordance with the invention may be summarized as follows: pure precipitated brushite ($CaHPO_4 \cdot 2H_2O$) is suspended in aqueous phosphoric acid at elevated temperature until it has been converted into anhydrous calcium hydrogen phosphate of the desired particle size and crystal structure; the anhydrous salt is separated off, washed and dried, and then converted to the desired γ-pyrophosphate by heating to 500°–600° C.

The reactivity of the γ-phosphate formed is enhanced, so that the phosphors prepared from it are brighter than phosphors in the preparation of which the usual calcium hydrogen phosphate has been used.

The following more detailed description of the preparation of the required type of calcium hydrogen phosphate, and the conversion of the γ-calcium pyrophosphate, given by way of example, will make the invention more readily apparent.

Purified aqueous diammonium hydrogen phosphate solution is slowly added to purified aqueous calcium chloride solution at a temperature of 18°–20° C. until a pH of 6.7–7.0 is reached. It will be found that the required final pH is reached by using approximately 35 liters of calcium chloride solution, specific gravity 1.142, pH 7.0, and 50 liters of diammonium hydrogen phosphate solution, specific gravity 1.093, pH 7.2.

The brushite which is precipitated is filtered off, washed and suspended in 77.5 liters of deionized water which contains sufficient phosphoric acid to give a pH value of 3.5.

This suspension is carefully stirred and the temperature raised at a rate not exceeding 3° C. per minute to 95° C. The temperature is maintained at 95° C. for 5 minutes. The brushite will then have been converted to anhydrous calcium hydrogen phosphate of the preferred particle size and crystal structure. The suspension is allowed to settle and the precipitate is removed by filtration. The precipitate is washed and carefully dried at 100°–120° C.

This method of preparation produces an especially pure, regular, anhydrous calcium phosphate with a particle size of 8–8½ microns as measured by the Fisher subsieve size method. Additionally, while the crystal unit cell is triclinic the crystal habit is approximately rhombohedral.

The conversion of this calcium hydrogen phosphate, to the required γ-calcium pyrophosphate, is carried out by heating it in a suitable vessel to a temperature between 500°–600° C., for example by heating in a silica crucible for 4 hours at 540° C. The crystal habit and particle size remain substantially the same. Care must be taken to complete the conversion, while at the same time avoiding the formation of the β- and α-pyrophosphates.

The accompanying illustrations show the contrast between typical products of the known procedure and of the method according to the invention.

Figure 1:
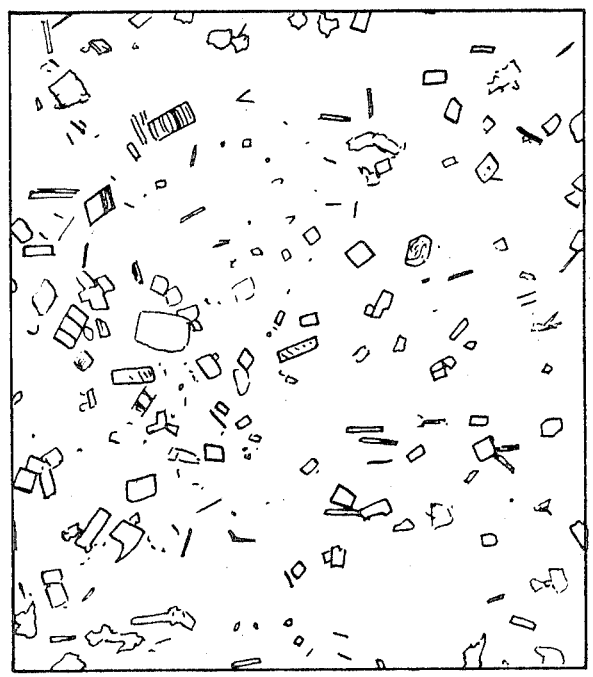
FIG. 1 shows calcium hydrogen phosphate prepared by a conventional procedure, namely by precipitation at 95° C. of aqueous calcium chloride, sp. gr. 1.1420 at 20° C., with sufficient aqueous diammonium phosphate, sp. gr. 1.1020 at 20° C. to give pH 3.5.
Figure 2:
FIG. 2 shows γ-calcium pyrophosphate prepared from the material of FIG. 1.
Figure 3:
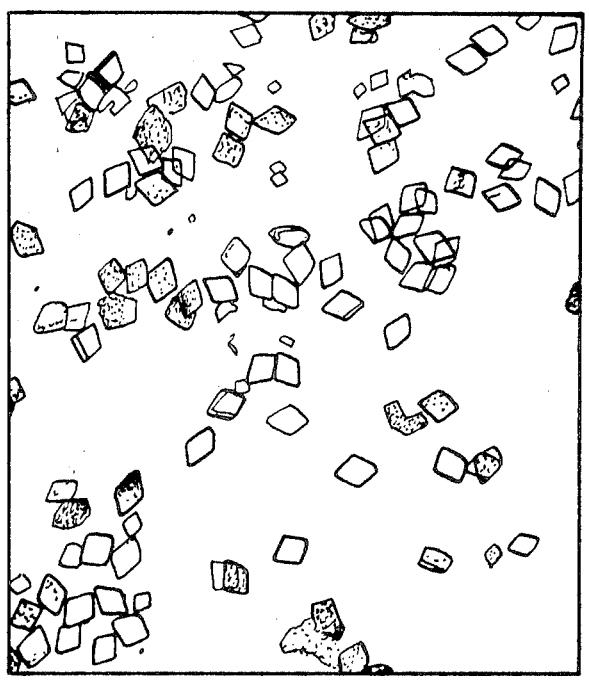
FIG. 3 shows calcium hydrogen phosphate prepared as described in the example above.
Figure 4:
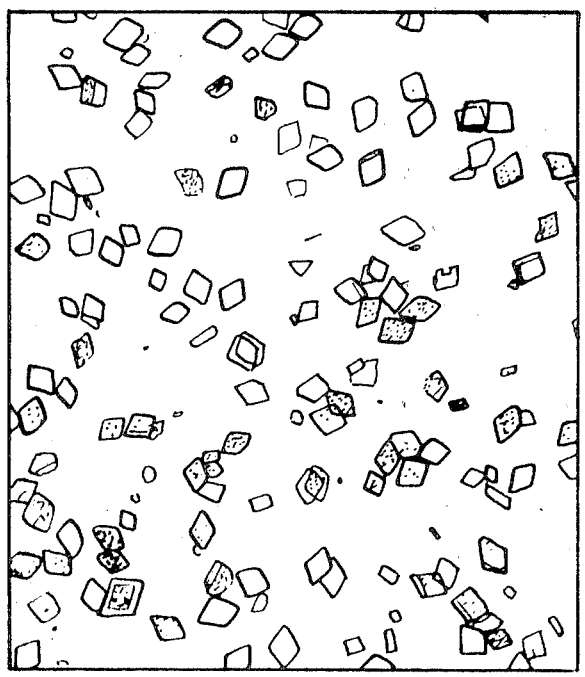
FIG. 4 shows γ-calcium pyrophosphate according to the invention, prepared from the phosphate of FIG. 3 as described in the example.

As an indication of the improved phosphor efficiencies obtainable by the use of the invention, γ-calcium pyrophosphate, manufactured in the above way and used in the whole range of standard halophosphate phosphors, gave a consistent 5 percent increase in efficiency over phosphors made using the normal calcium hydrogen phosphate.

By way of more specific example, the following table shows lamp efficiencies obtained using typical phosphors manufactured from the γ-calcium pyrophosphates according to the invention, compared with phosphors manufactured from the usual calcium hydrogen phosphate.

The phosphors were prepared by conventional techniques, by blending the following initial mixtures and firing in a crucible for 3 hours at 1,120° C., preferably in a nonoxidizing atmosphere.

|  | Prior Art | | According To the invention | |
|---|---|---|---|---|
|  | Daylight (4300° K.) | White (3500° K.) | Daylight | White |
| $CaHPO_4$ | 255 | 255 | — | — |
| γ-$Ca_2P_2O_7$ | — | — | 233 | 233 |
| $CaF_2$ | 21.5 | 21.5 | 21.5 | 21.5 |
| $Sb_2O_3$ | 8.82 | 8.82 | 8.82 | 8.82 |
| $MnCo_3$ | 6.9 | 11.0 | 6.9 | 11.0 |
| $CaCO_3$ | 76.4 | 76.4 | 76.4 | 76.4 |
| $NH_4Cl$ | 7.65 | 7.65 | 7.65 | 7.65 |
| $CaCO_3$ | 5.4 | 5.4 | 5.4 | 5.4 |

The phosphors made were tested in 4-foot 40-watt fluorescent lamps of standard construction, and each value represents the average of six lamps.

|  |  | 0 hours | 100 hours |
|---|---|---|---|
| Example 1. | Using daylight-type halophosphate phosphor. | | |
|  | Phosphor with $CaHPO_4$ | 3136 | 3063 |
|  | Phosphor with $Ca_2P_2O_7$ | 3285 | 3215 |
| Example 2. | Using White-type halophosphate phosphor. | | |
|  | Phosphor with $CaHPO_4$ | 3250 | 3176 |
|  | Phosphor with $Ca_2P_2O_7$ | 3410 | 3342 |

It will be appreciated by those skilled in the art of phosphor making, that all raw materials, firing procedures, postfiring treatments and suspension manufacture must be carefully controlled.

We claim:

1. A method of preparing gamma-calcium pyrophosphate phosphor comprising the steps of:
   slowly adding purified aqueous diammonium hydrogen phosphate solution to purified aqueous calcium chloride solution at a temperature of 18°–20° C. until a pH of 6.7–7.0 is reached and brushite is precipitated from the solution;

filtering off the brushite;
washing the brushite;
suspending the brushite in water acidified to a pH of 3.5 with phosphoric acid;
stirring the suspension and raising the temperature thereof at a rate not exceeding 3° per minute until a temperature of 95° C. is attained and maintaining the 95° C. temperature for 5 minutes, thereby converting the brushite to anhydrous calcium hydrogen phosphate having a regular particle size of 8–8½ microns and having an approximately rhombohedral crystal habit;
removing the calcium hydrogen phosphate by filtration;
washing the calcium hydrogen phosphate;
drying the calcium hydrogen phosphate at a temperature of 100°–120° C.;
and heating the calcium hydrogen phosphate at a temperature between 500°–600° C. to convert it to gamma-calcium pyrophosphate without substantial change in the particle size and crystal habit.

* * * * *